(12) United States Patent
Ito (10) Patent No.: US 11,204,623 B2
(45) Date of Patent: Dec. 21, 2021

(54) ELECTRO-OPTICAL DEVICE AND ELECTRONIC APPARATUS

(71) Applicant: SEIKO EPSON CORPORATION, Tokyo (JP)

(72) Inventor: Satoshi Ito, Eniwa (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 17/023,345

(22) Filed: Sep. 16, 2020

(65) Prior Publication Data

US 2021/0089078 A1 Mar. 25, 2021

(30) Foreign Application Priority Data

Sep. 19, 2019 (JP) .............................. JP2019-170225

(51) Int. Cl.
*G06F 1/16* (2006.01)
*G02F 1/1335* (2006.01)

(52) U.S. Cl.
CPC ...... *G06F 1/1609* (2013.01); *G02F 1/133512* (2013.01); *G02F 1/133514* (2013.01); *G06F 1/1637* (2013.01)

(58) Field of Classification Search
CPC .... G06F 1/1609; G06F 1/1626; G06F 1/1637; G06F 1/133512; G06F 1/133514
See application file for complete search history.

(56) References Cited

U.S. PATENT DOCUMENTS

| | | | | |
|---|---|---|---|---|
| 9,368,546 B2* | 6/2016 | Fleck | ............... | H01L 27/156 |
| 9,541,697 B2* | 1/2017 | Bohn | ............... | G02B 6/0036 |
| 9,684,174 B2* | 6/2017 | Fleck | ............... | H01L 33/58 |
| 9,726,887 B2* | 8/2017 | Fleck | ............... | G02B 27/017 |
| 9,772,705 B2* | 9/2017 | Oh | ............... | G06F 3/0443 |
| 10,082,897 B2* | 9/2018 | Oh | ............... | G06F 3/0445 |
| 10,146,344 B2* | 12/2018 | Chang | ............... | G06F 3/04186 |
| 10,765,020 B2* | 9/2020 | Prest | ............... | G02F 1/13439 |
| 10,826,014 B2* | 11/2020 | Liu | ............... | H01L 51/0097 |
| 10,842,036 B2* | 11/2020 | Pakula | ............... | H05K 5/03 |

(Continued)

FOREIGN PATENT DOCUMENTS

| | | |
|---|---|---|
| JP | 2006078929 | 3/2006 |
| JP | 2011150226 | 8/2011 |

(Continued)

*Primary Examiner* — Adrian S Wilson
(74) *Attorney, Agent, or Firm* — JCIPRNET (57) ABSTRACT

An electro-optical device includes a first translucent plate, a display panel, and a second translucent plate that is bonded to a surface of the display panel on an opposite side from the first translucent plate. The display panel includes a first substrate including pixel electrodes provided in a display region, a second substrate including a common electrode, an electro-optical layer which is disposed between the pixel electrodes and the common electrode, and a sealing member that is provided in a sealing region along an outer edge of the display region and between the first substrate and the second substrate, and adheres the first substrate and the second substrate. When seen from a thickness direction of the first translucent plate, an outer edge of the first translucent plate overlaps the outer edge of the display region, or is positioned between the display region and the sealing region.

9 Claims, 11 Drawing Sheets

(56) References Cited

U.S. PATENT DOCUMENTS

| | | | |
|---|---|---|---|
| 10,912,220 B2* | 2/2021 | Pakula | H05K 5/03 |
| 2010/0277439 A1* | 11/2010 | Charlier | G06F 1/1616 |
| | | | 345/176 |
| 2011/0181937 A1 | 7/2011 | Miyashita | |
| 2011/0242750 A1* | 10/2011 | Oakley | G06F 1/1637 |
| | | | 361/679.27 |

FOREIGN PATENT DOCUMENTS

| | | |
|---|---|---|
| JP | 2012208427 | 10/2012 |
| JP | 2015200687 | 11/2015 |
| JP | 2017142280 | 8/2017 |

* cited by examiner

ELECTRO-OPTICAL DEVICE AND ELECTRONIC APPARATUS

The present application is based on, and claims priority from JP Application Serial Number 2019-170225, filed Sep. 19, 2019, the disclosure of which is hereby incorporated by reference herein in its entirety.

BACKGROUND

1. Technical Field

The present disclosure relates to an electro-optical device and an electronic apparatus.

2. Related Art

For example, a electro-optical device, such as a liquid crystal device, is known that is used as a light valve of a projector. JP-A-2017-142280 discloses a liquid crystal device including a display panel. The display panel includes a liquid crystal layer provided between an element substrate and a counter substrate disposed facing each other via a sealing material. In addition, the liquid crystal device described in JP-A-2017-142280 is provided with two dust-proof substrates that sandwich a display panel. One dust-proof substrate is bonded by adhesive to an emission surface of the display panel. The other dust-proof substrate is bonded by adhesive to an incident surface of the display panel, and overlaps the sealing material when viewed from the thickness direction of the dust-proof substrate.

However, when the liquid crystal device including the dust-proof substrates is continuously used in a projector, for example, the thickness of the liquid crystal layer changes as a result of deterioration or deformation of the adhesive that bonds the display panel and the dust-proof substrates due to the influence of light from the light source. As a result, yellowing may occur in the image displayed by the display panel. Thus, in a known dust-proof substrate arrangement, there is a problem in that the quality of the image displayed by the display panel may deteriorate.

SUMMARY

An electro-optical device according to an aspect of the present disclosure includes a first translucent plate on which light is incident, a display panel bonded, by an adhesive, to the first translucent plate, a second translucent plate bonded, by an adhesive, to a surface of the display panel on an opposite side from the first translucent plate and configured to emit light from the display panel. The display panel includes a first substrate including a plurality of pixel electrodes provided in a display region, a second substrate including a common electrode, an electro-optical layer which is disposed between the plurality of pixel electrodes and the common electrode, and optical characteristics of which change in accordance with an electrical field, and a sealing member provided in a sealing region along an outer edge of the display region and between the first substrate and the second substrate, and configured to adhere the first substrate and the second substrate together. When seen from a thickness direction of the first translucent plate, an outer edge of the first translucent plate overlaps the outer edge of the display region or is positioned between the display region and the sealing region.

DESCRIPTION OF EXEMPLARY EMBODIMENTS

Preferred embodiments of the present disclosure will be described below with reference to the accompanying drawings. Note that, in the drawings, dimensions and scales of each of portions are different from actual dimensions and scales as appropriate, and some of the portions are schematically illustrated for ease of understanding. Further, the scope of the present disclosure is not limited to these embodiments unless otherwise stated to limit the present disclosure in the following descriptions.

Electro-Optical Device

1. First Embodiment

Figure 1:
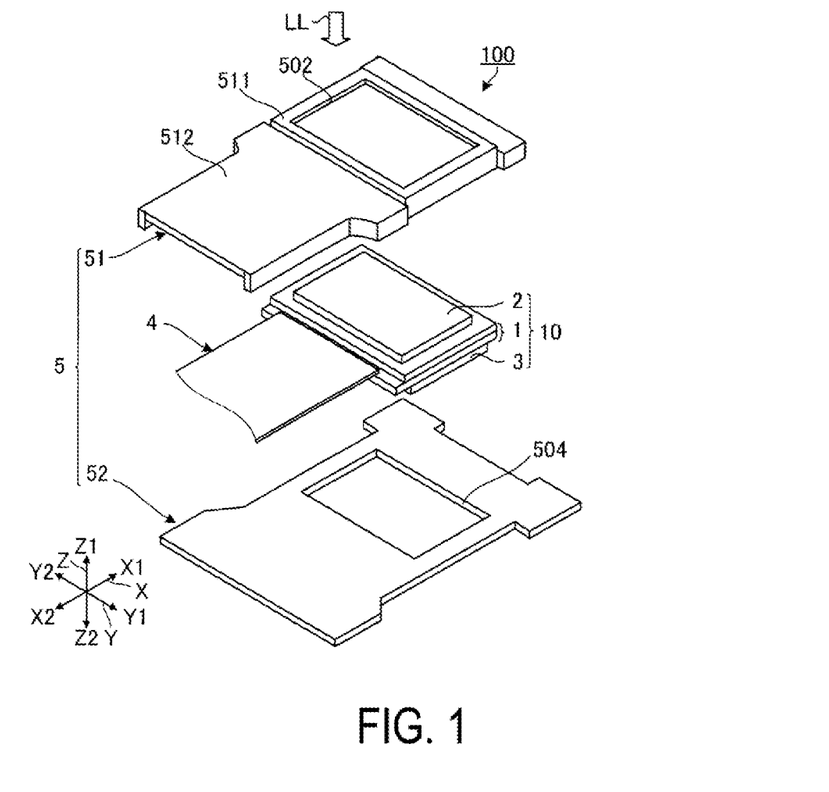
FIG. 1 is an exploded perspective view illustrating a configuration of an electro-optical device according to a first embodiment.
Figure 2:
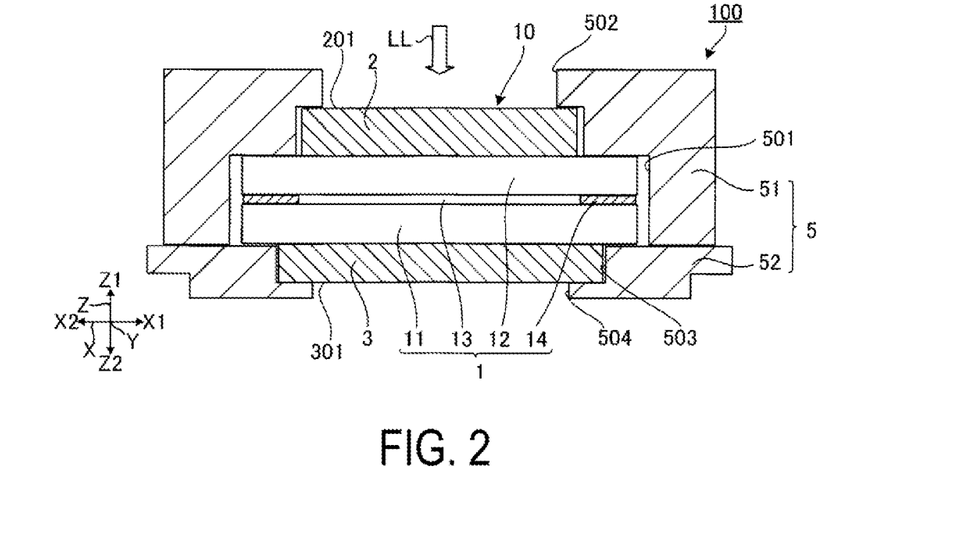
FIG. 2 is a cross-sectional view schematically illustrating the electro-optical device.

FIG. 1 is an exploded perspective view of an electro-optical device 100 according to a first embodiment. FIG. 2 is a cross-sectional view schematically illustrating the electro-optical device 100. Note that, for convenience of explanation, the description below will be made as appropriate using an X-axis, a Y-axis, and a Z-axis orthogonal to each other. Further, one direction along the X-axis is referred to as a direction X1, and the direction opposite to the direction X1 is referred to as a direction X2. Similarly, one direction along the Y-axis is referred to as a direction Y1, and the direction opposite to the direction Y1 is referred to as a direction Y2. One direction along the Z-axis is referred to as a direction Z1, and the direction opposite to the direction Z1 is referred to as a direction Z2.

The electro-optical device 100 illustrated in FIG. 1 is an active matrix liquid crystal device. The electro-optical device 100 is used as a light valve provided in a projector described below. As illustrated in FIG. 1, the electro-optical device 100 includes a display panel unit 10, a wiring substrate 4, and a holding member 5. The display panel unit 10 includes a display panel 1, which is a translucent liquid crystal panel, a transmissive first translucent plate 2, and a transmissive second translucent plate 3. The first translucent plate 2 and the second translucent plate 3 sandwich the display panel 1. Light LL is incident on the first translucent plate 2, passes through the display panel 1, and is emitted from the second translucent plate 3. The light LL is visible light. In the following description, "translucent" refers to transmittance of visible light, and means that a transmittance of visible light is preferably greater than 50%. Further, in the following description, viewing from the Z1 direction or the Z2 direction, which is the thickness direction of the first translucent plate 2, is referred to as "in plan view".

1-1. Holding Member 5

The holding member 5 illustrated in FIG. 1 is a member that holds the display panel unit 10. The holding member 5 includes a cover 51 and a plate 52. The display panel unit 10 and a portion of the wiring substrate 4 are disposed between the cover 51 and the plate 52. The cover 51 and the plate 52 are connected by being screwed together, for example.

As illustrated in FIG. 1, the cover 51 is disposed on the side of the display panel unit 10 on which the light LL is incident. The cover 51 includes a cover body 511 and a heat dissipating portion 512. The cover body 511 is a frame-shaped member that is substantially quadrangular in plan view. The heat dissipating portion 512 extends in the direction X2 from the cover body 511.

As illustrated in FIG. 2, the cover body 511 is provided with a first housing portion 501 and a first opening portion 502. The first housing portion 501 houses the display panel 1 and the first translucent plate 2. The first housing portion 501 is a space formed by a stepped inner wall surface of the cover body 511. The first opening portion 502 is a hole through which the light LL passes. An incident surface 201 of the first translucent plate 2 is exposed from the first opening portion 502. The incident surface 201 is parallel to an X-Y plane. Further, the heat dissipating portion 512 illustrated in FIG. 1 allows heat generated by an electronic component, such as an IC mounted on the wiring substrate 4, to escape. Although not illustrated, the heat dissipating portion 512 includes a plurality of heat dissipating fins, for example. Further, together with the plate 52, the heat dissipating portion 512 holds a part of the wiring substrate 4.

As described above, the cover 51 is disposed on the side of the display panel unit 10 on which the light LL is incident. Therefore, the temperature of the cover 51 is easily increased by receiving the light LL. Accordingly, it is preferable that the cover 51 be configured by a material having excellent thermal conductivity so as to suppress changes in display characteristics of the display panel 1 caused by the increase in temperature. Specific examples of the constituent material of the cover 51 include metal, such as aluminum, magnesium, copper, and the like, or an alloy including the metals. Note that the cover 51 may be formed by a single member or may be formed by a plurality of members.

As illustrated in FIG. 1, the plate 52 is disposed on the side of the display panel unit 10 from which the light LL is emitted. As illustrated in FIG. 2, the plate 52 is provided with a second housing portion 503 and a second opening portion 504. The second housing portion 503 houses the second translucent plate 3. The second housing portion 503 is a space formed by an inner wall surface of the plate 52. The second opening portion 504 is a hole through which the light LL passes. An emission surface 301 of the second translucent plate 3 is exposed from the second opening portion 504. The emission surface 301 is parallel to the X-Y plane.

From the perspective of heat dissipation and the like of the wiring substrate 4, the plate 52 is preferably formed from a material having excellent thermal conductivity. Examples of the constituent material of the plate 52 include metal, such as aluminum, magnesium, copper, or the like, or an alloy including the metals. Note that the plate 52 may be formed by a single member or may be formed by a plurality of members.

Further, although not illustrated, the plate 52 or the cover 51 may be provided with a refrigerant passage through which a refrigerant for cooling the display panel 1 is passed. The refrigerant passage is disposed along a peripheral edge of the display panel unit 10, for example.

1-2. Wiring Substrate 4

As illustrated in FIG. 1, the wiring substrate 4 is mounted on the display panel 1 and extends in the direction X2 from the display panel 1. The wiring substrate 4 is configured by, for example, a flexible wiring substrate or the like that electrically couples the display panel 1 and an external circuit (not illustrated).

1-3. Display Panel Unit 10

As illustrated in FIG. 2, the display panel unit 10 is sandwiched by the cover 51 and the plate 52. Thus, the display panel unit 10 is in contact with the cover 51 and the plate 52. The display panel unit 10 and the cover 51 may be bonded by an adhesive, for example. Similarly, the display panel unit 10 and the plate 52 may be bonded by an adhesive, for example.

As described above, the display panel unit 10 is provided with the display panel 1, the first translucent plate 2, and the second translucent plate 3. The first translucent plate 2 is positioned on the side of the display panel 1 on which the light LL is incident. The second translucent plate 3 is positioned on the side of the display panel 1 from which the light LL is emitted. Further, the display panel 1 includes an element substrate 11, a counter substrate 12, a liquid crystal layer 13, and a sealing member 14. The element substrate 11 is an example of a "first substrate". The counter substrate 12 is an example of a "second substrate". In the present embodiment, the light LL incident from the counter substrate 12 is incident on the liquid crystal layer 13 and is emitted from the element substrate 11. Note that, as illustrated in FIG. 1, each of the shapes of the display panel 1, the first translucent plate 2, and the second translucent plate 3 are substantially quadrangular in plan view, but the shapes are not limited thereto, and are optional.

1-3a. Display Panel 1

Figure 3:
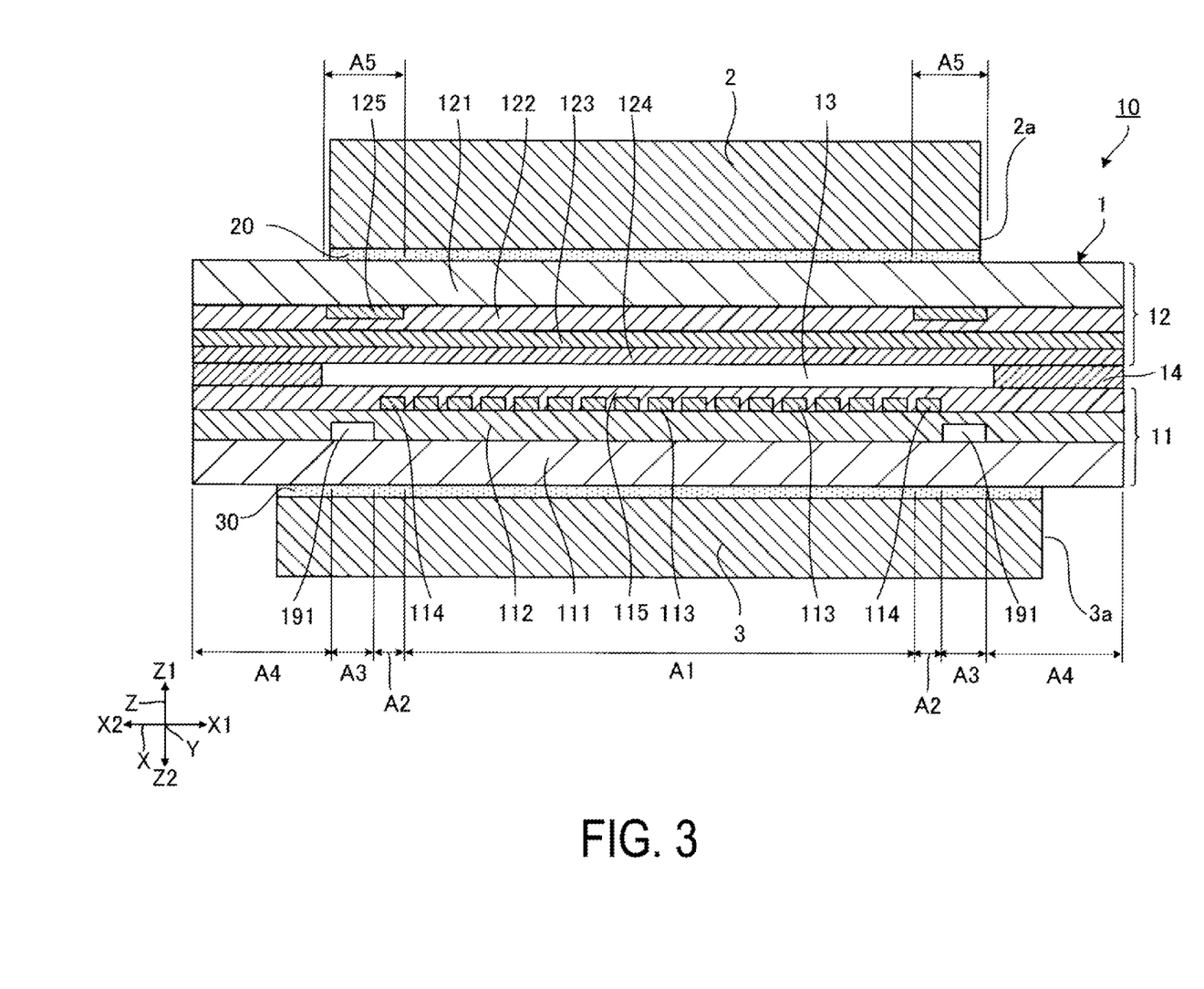
FIG. 3 is a cross-sectional view of a display panel unit.

FIG. 3 is a cross-sectional view of the display panel unit 10. As illustrated in FIG. 3, the element substrate 11 includes a first base material 111, a first insulating layer 112, a plurality of pixel electrodes 113, a plurality of dummy pixel electrodes 114, and a first oriented film 115. Further, although not illustrated, the element substrate 11 includes switching elements provided for each of the pixel electrodes 113. The switching element is configured by a transistor such as a TFT, for example. Further, although not illustrated, the element substrate 11 includes various wiring lines such as scanning lines, data lines, and capacitance lines.

As illustrated in FIG. 3, the first base material 111 is translucent and has insulating properties, and is configured by a flat plate, such as glass or quartz, for example. The first insulating layer 112 is disposed on the first base material 111 and is configured by a silicon based translucent inorganic material having insulating properties, such as silicon oxide, for example. The plurality of pixel electrodes 113 and the plurality of dummy pixel electrodes 114 are disposed on the first insulating layer 112. The plurality of pixel electrodes 113 and the plurality of dummy pixel electrodes 114 are respectively configured by a transparent electrode material, such as indium tin oxide (ITO) or indium zinc oxide (IZO), for example. The dummy pixel electrode 114 is an electrode that does not contribute to display. The first oriented film 115 is disposed on the plurality of pixel electrodes 113 and the plurality of dummy pixel electrodes 114, and is configured by, for example, polyimide, silicon oxide, and the like.

Figure 4:
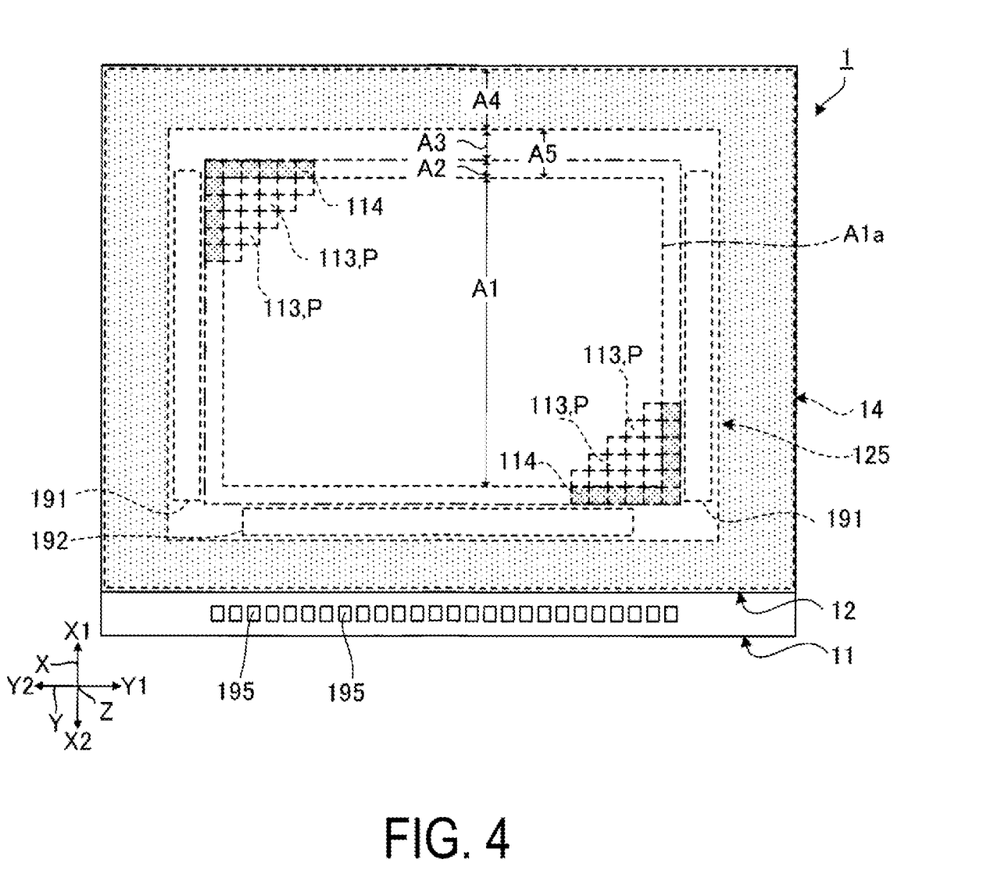
FIG. 4 is a plan view of a display panel.

FIG. 4 is a plan view of the display panel 1. Note that in FIG. 4, the dummy pixel electrodes 114 and the sealing member 14 are marked with dots for convenience. As illustrated in FIG. 4, the plurality of pixel electrodes 113 are arranged in a matrix pattern in the direction along the X-axis and in the direction along the Y-axis. A region in which the plurality of pixel electrodes 113 are provided is a display region A1. In FIG. 4, the shape of the display region A1 in plan view is quadrangular. The display region A1 is provided with a plurality of pixels P arranged in a matrix pattern. The pixel electrode 113 is provided for each of the pixels P. Further, the plurality of dummy pixel electrodes 114 surround the plurality of pixel electrodes 113 in plan view. A region in which the plurality of dummy pixel electrodes 114 are provided is a dummy pixel region A2. The dummy pixel region A2 is a quadrangular frame-shaped region and surrounds the display region A1 in plan view.

As illustrated in FIG. 4, a planar area of the element substrate 11 is larger than a planar area of the counter substrate 12. The element substrate 11 has a section that protrudes in the direction X2 from the counter substrate 12 in plan view. The section is provided with a plurality of terminals 195 for electrical coupling to the wiring substrate 4 illustrated in FIG. 1. Further, as illustrated in FIG. 4, a plurality of drive circuits are provided on the element substrate 11. Specifically, the element substrate 11 is provided with a scanning line drive circuit 191 connected to the scanning lines, and a data line drive circuit 192 connected to the data lines. A region in which the scanning line drive circuit 191 and the data line drive circuit 192 are provided is a circuit region A3. The circuit region A3 is a quadrangular frame-shaped region and surrounds the display region A1 in plan view. Further, the circuit region A3 surrounds the dummy pixel region A2 in plan view.

As illustrated in FIG. 3, the counter substrate 12 includes a second base material 121, a second insulating layer 122, a common electrode 123, a second oriented film 124, and a light shielding portion 125. The second base material 121 is translucent and has insulating properties, and is configured by a flat plate, such as glass or quartz, for example. The second insulating layer 122 is disposed on the second base material 121 and is formed from a translucent silicon based inorganic material having insulating properties, such as silicon oxide, for example. The common electrode 123 is disposed on the second insulating layer 122 and is configured by a transparent conductive material, such as ITO or IZO, for example. The second oriented film 124 is disposed on the common electrode 123, and is configured by, for example, polyimide, silicon oxide, and the like. The light shielding portion 125 has light shielding properties, and functions as a demarcation to prevent stray light from entering the display region A1. By providing the light shielding portion 125, high contrast of the image displayed by the display panel 1 can be secured. Examples of the constituent material of the light shielding portion 125 include metal, such as aluminum, magnesium, copper, and the like, or an alloy including the metals.

As illustrated in FIG. 4, the light shielding portion 125 is a quadrangular frame-shaped member that overlaps with the dummy pixel region A2 and the circuit region A3 in plan view. Further, the light shielding portion 125 surrounds the plurality of pixel electrodes 113 in plan view. Accordingly, the light shielding portion 125 surrounds the display region A1 in plan view. A region in which the light shielding portion 125 is provided is a light shielding region A5. Note that the light shielding portion 125 need not necessarily surround all of the display region A1 in plan view. Further, the light shielding portion 125 need not necessarily overlap with one or both of the dummy pixel region A2 and the circuit region A3 in plan view. Further, the light shielding portion 125 may overlap with a part of the dummy pixel region A2 and a part of the circuit region A3 in plan view.

Note that the element substrate 11 described above may include components other than each of the components illustrated in FIG. 3. For example, the element substrate 11 may be provided with a micro lens or the like that refracts the light LL. Similarly, the counter substrate 12 may include components other than each of the components illustrated in FIG. 3. For example, the counter substrate 12 may be provided with a micro lens or the like that refracts the light LL.

The liquid crystal layer 13 illustrated in FIG. 3 contains liquid crystal molecules having positive or negative dielectric anisotropy. The liquid crystal layer 13 is sandwiched between the element substrate 11 and the counter substrate 12 such that the liquid crystal molecules are in contact with both the first oriented film 11 and the second oriented film 124. The liquid crystal layer 13 is an example of an "electro-optical layer". The liquid crystal layer 13 is disposed between the plurality of pixel electrodes 113 and the common electrode 123, and optical characteristics of the liquid crystal layer 13 change in accordance with an electrical field. Specifically, the orientation of the liquid crystal molecules included in the liquid crystal layer 13 changes in accordance with a voltage applied to the liquid crystal layer 13.

As illustrated in FIG. 3, the sealing member 14 is disposed between the element substrate 11 and the counter substrate 12, and adheres the element substrate 11 and the counter substrate 12 together. The sealing member 14 is formed using an adhesive or the like containing various types of curable resins such as epoxy resin, for example. As illustrated in FIG. 4, the sealing member 14 is a quadrangular frame-shaped region, and surrounds the plurality of pixel electrodes 113 in plan view. Accordingly, the sealing member 14 surrounds the display region A1 in plan view. A region in which the sealing member 14 is provided is a sealing region A4. In the present embodiment, the sealing region A4 surrounds the circuit region A3 in plan view.

As described above, the above-described display panel 1 includes the display region A1, the dummy pixel region A2, the circuit region A3, the sealing region A4, and the light shielding region A5. As illustrated in FIG. 4, the dummy pixel region A2, the circuit region A3, and the light shielding region A5 are positioned on the outside of the display region A1 and are positioned on the inside of the sealing region A4 in plan view. In other words, the dummy pixel region A2, the circuit region A3, and the light shielding region A5 are each positioned between the sealing region A4 and the display region A1 in plan view. Further, the dummy pixel region A2, the circuit region A3, the sealing region A4, and the light shielding region A5 are each provided along an outer edge A1a of the display region A1 in plan view.

1-3b. First Translucent Plate 2 and Second Translucent Plate 3

The first translucent plate 2 and the second translucent plate 3 illustrated in FIG. 3 are each dust-proof members for protecting the display panel 1 and inhibiting foreign matter, such as dust, from attaching to the display panel 1. The first translucent plate 2 is bonded to the counter substrate 12 of the display panel 1 by an adhesive 20, and the second translucent plate 3 is bonded to the element substrate 11 of the display panel 1 by an adhesive 30. In other words, the first translucent plate 2 is bonded to the display panel 1 by the adhesive 20, and the second translucent plate 3 is bonded, by the adhesive 30, to a surface of the display panel 1 opposite from the first translucent plate 2.

The first translucent plate 2 and the second translucent plate 3 are each configured by a translucent inorganic material having insulating properties. Specifically, the first translucent plate 2 and the second translucent plate 3 are each formed from quartz, sapphire, crystal, or the like, for example. Of these, sapphire is particularly preferable. Sapphire has, for example, better thermal conductivity than quartz. Therefore, the heat dissipation of the display panel 1 can be improved by using sapphire.

The adhesives 20 and 30 are each translucent. The adhesives 20 and 30 may be thermosetting adhesive or photo-curable adhesive. Further, the constituent materials of the adhesive 20 and the constituent materials of the adhesive 30 may be the same as each other or may be different from each other. Note that in the present embodiment, the adhesive 20 is provided over an entire region in which the first translucent plate 2 and the display panel 1 overlap in plan view, but the adhesive 20 may be provided on only a part of the overlapping region. Similarly, the adhesive 30 is provided over an entire region in which the second translucent plate 3 and the display panel 1 overlap in plan view, but the adhesive 30 may be provided on only a part of the overlapping region.

Figure 5:
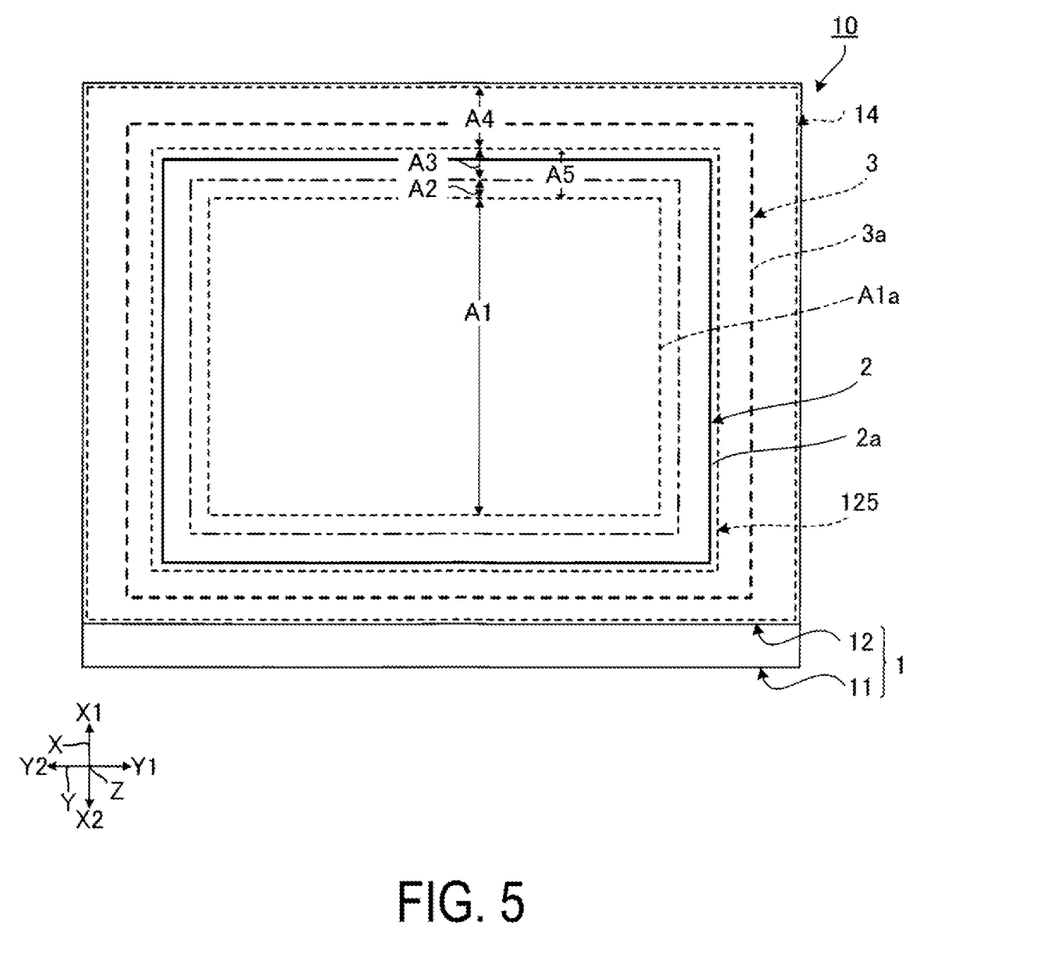
FIG. 5 is a plan view illustrating an arrangement of a first translucent plate.

FIG. 5 is a plan view illustrating an arrangement of the first translucent plate 2. As illustrated in FIG. 5, the planar area of the first translucent plate 2 is smaller than the planar area of the display panel 1. Similarly, the planar area of the second translucent plate 3 is smaller than the planar area of the display panel 1. Further, the planar area of the first translucent plate 2 is smaller than the planar area of the second translucent plate 3.

Further, the planar area of the first translucent plate 2 is larger than the planar area of the display region A1. The first translucent plate 2 overlaps with the display region A1 in plan view. Further, the first translucent plate 2 is positioned on the inside of the sealing region A4 in plan view. The first translucent plate 2 does not overlap with the sealing region A4 in plan view. Therefore, an outer edge 2a of the first translucent plate 2 is positioned between the outer edge A1a of the display region A1 and the sealing region A4 in plan view.

By overlapping the first translucent plate 2 with the display region A1 in plan view, it is possible to suppress foreign matter, such as dust, from attaching to the counter substrate 12 in the display region A1. Therefore, it is possible to reduce the effect of the foreign matter on the image displayed by the display panel 1. Further, when the first translucent plate 2 is positioned on the inside of the sealing region A4 in plan view, the planar area of the first translucent plate 2 can be reduced compared to when the first translucent plate 2 overlaps with the sealing region A4 in plan view. As a result, the area of bonding of the first translucent plate 2 and the display panel 1 using the adhesive 20 can be reduced. It is therefore possible to suppress deterioration or deformation of the adhesive 20, and inhibit the counter substrate 12 from deforming due to the deterioration or deformation. Thus, changes in the thickness of the liquid crystal layer 13 and an increase in variations in the thickness can be suppressed. As a result, it is possible to suppress a deterioration in image quality of the image displayed by the display panel 1. Accordingly, it is possible to suppress yellowing of the image displayed by the display panel 1. As a result of the above, the electro-optical device 100 can suppress image quality deterioration, such as color unevenness of the image, or the like.

As illustrated in FIG. 3 and FIG. 5, the outer edge 2a of the first translucent plate 2 overlaps with the light shielding portion 125 in plan view. In other words, the outer edge 2a of the first translucent plate 2 overlaps with the light shielding region A5 in plan view. Further, the outer edge 2a of the first translucent plate 2 overlaps with the circuit region A3 in plan view. Thus, the planar area of the first translucent plate 2 is larger than the planar area of the display region A1. Therefore, compared to a case in which the planar area of the first translucent plate 2 is the same as the planar area of the display region A1, the attachment of foreign matter in the display region A1 can be effectively suppressed by the first translucent plate 2. Further, the display region A1 can be covered by the first translucent plate 2 regardless of an assembly tolerance of the first translucent plate 2 with respect to the display panel 1.

Note that in the present embodiment, all of the outer edge 2a of the first translucent plate 2 overlaps with the light shielding region A5 in plan view, but only a part of the outer edge 2a may overlap with the light shielding region A5 in plan view. Further, in the present embodiment, all of the outer edge 2a of the first translucent plate 2 overlaps with the circuit region A3 in plan view, but only a part of the outer edge 2a may overlap with the circuit region A3 in plan view.

As illustrated in FIG. 5, the planar area of the first translucent plate 2 is smaller than the planar area of the second translucent plate 3. The outer edge 2a of the first translucent plate 2 is positioned on the inside of an outer edge 3a of the second translucent plate 3 in plan view. Here, as described above, the first translucent plate 2 is positioned on the side of the display panel 1 on which the light LL is incident. Therefore, the adhesive 20 illustrated in FIG. 3 is more susceptible to deterioration or deformation due to the effect of the light LL, compared to the adhesive 30. Thus, by positioning the outer edge 2a of the first translucent plate 2 on the inside of the outer edge 3a of the second translucent plate 3 in plan view, it is possible to particularly effectively suppress the change in thickness of the liquid crystal layer 13 due to the deformation of the counter substrate 12 caused by the deterioration and deformation of the adhesive 20. Note that the position of the outer edge 3a of the second translucent plate 3 is not particularly limited, but it is preferable for the outer edge 3a of the second translucent plate 3 to be positioned on the outside of the display region A1 in plan view. In this way, it is possible to prevent the attachment of foreign matter in the display region A1.

Further, as described above, the first translucent plate 2 is in contact with the cover 51 of the holding member 5 illustrated in FIG. 2. Therefore, the heat dissipation of the display panel 1 can be improved compared to a case in which the first translucent plate 2 is not in contact with the holding member 5. Thus, the possibility of defects in the display panel 1, such as a malfunction or the like occurring due to the accumulation of heat in the display panel 1, can be suppressed. Further, the cover 51 is preferably in contact with the display panel 1. By causing the cover 51 to be in contact with the display panel 1, the heat dissipation of the display panel 1 can be improved compared to a case in which the cover 51 is not in contact with the display panel 1.

2. Second Embodiment

In a second embodiment described below, components whose functions are identical to those of the first embodiment are assigned the same reference signs as those used in the description of the first embodiment. Further, a detailed description of the components is omitted as appropriate.

Figure 6:
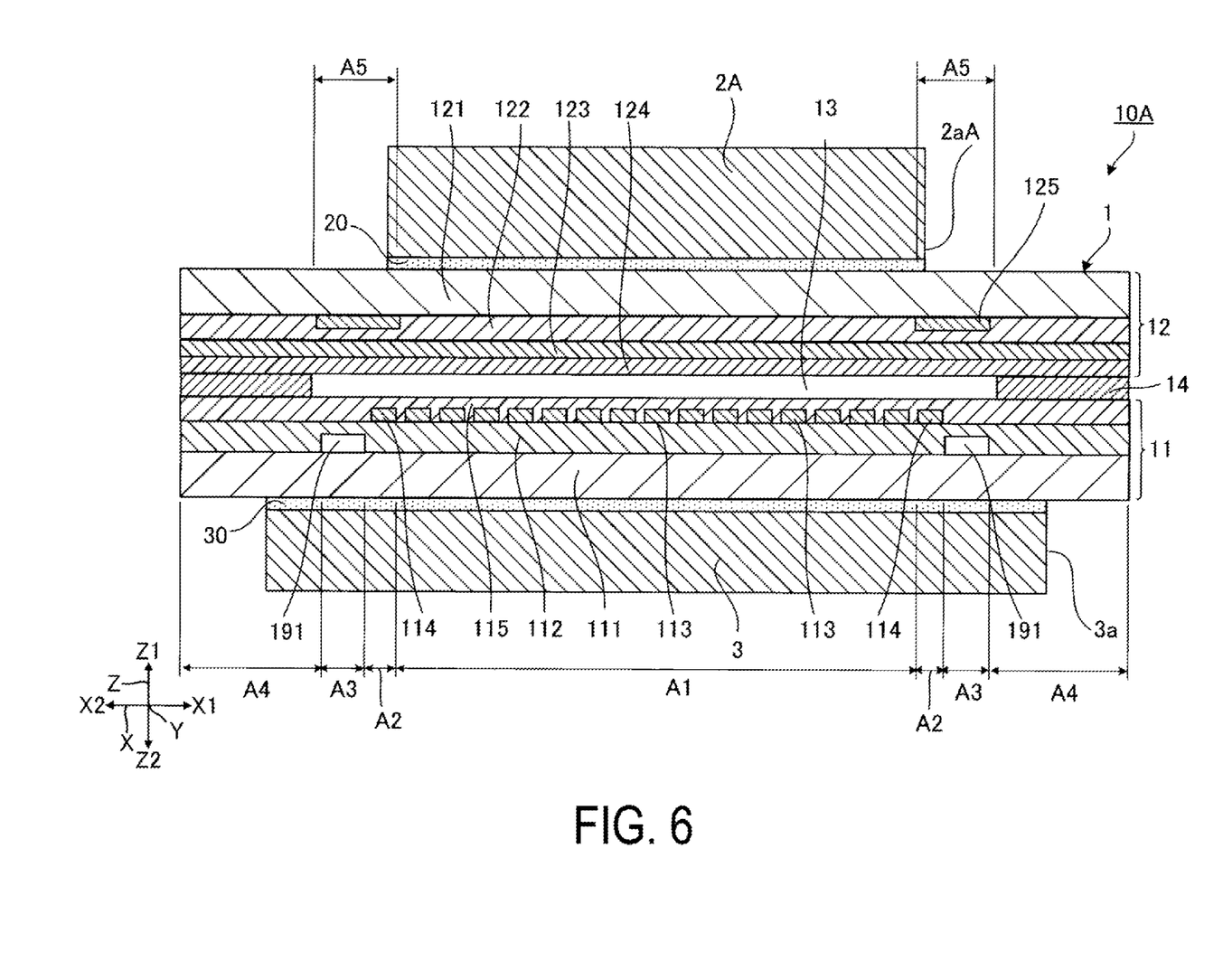
FIG. 6 is a cross-sectional view of a display panel unit according to a second embodiment.
Figure 7:
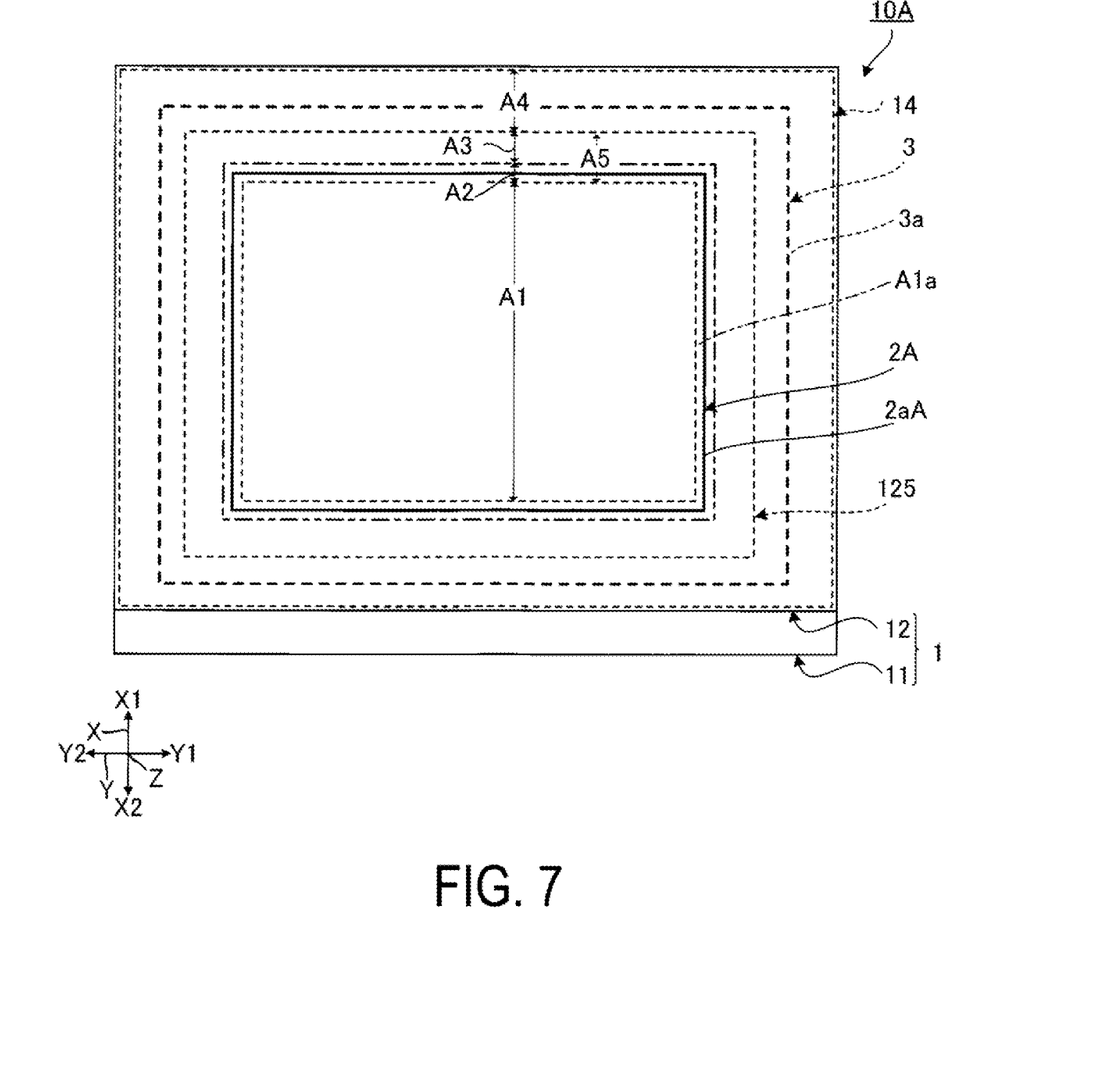
FIG. 7 is a plan view illustrating an arrangement of a first translucent plate according to the second embodiment.

FIG. 6 is a cross-sectional view illustrating a display panel unit 10A according to the second embodiment. FIG. 7 is a plan view illustrating an arrangement of a first translucent plate 2A according to the second embodiment. The planar area of the first translucent plate 2A according to the present embodiment is smaller than the planar area of the first translucent plate 2 according to the first embodiment. Specifically, as illustrated in FIG. 6 and FIG. 7, an outer edge 2aA of the first translucent plate 2A overlaps with the dummy pixel region A2 in plan view and does not overlap with the circuit region A3 in plan view. Therefore, compared to a case in which the first translucent plate 2A overlaps with the circuit region A3 in plan view, the area of bonding for the first translucent plate 2A and the display panel 1 using the adhesive 20 can be reduced. Thus, a deterioration in image quality due to the deterioration or the like of the adhesive 20 can be more effectively suppressed. Further, the outer edge 2aA of the first translucent plate 2A overlaps with the dummy pixel region A2 in plan view. Therefore, the planar area of the first translucent plate 2A is larger than the planar area of the display region A1. Thus, the display region A1 can be covered by the first translucent plate 2A regardless of an assembly tolerance of the first translucent plate 2A with respect to the display panel 1.

Further, in plan view, a distance between the outer edge 2aA of the first translucent plate 2A and the display region A1 is shorter than a distance between the outer edge 2aA of the first translucent plate 2A and the sealing region A4. In other words, the outer edge 2aA of the first translucent plate 2A is closer to the display region A1 than to the sealing region A4 in plan view. Therefore, compared to a case in which the outer edge 2aA of the first translucent plate 2A is closer to the sealing region A4 than to the display region A1 in plan view, the area of bonding for the first translucent plate 2 and the display panel 1 using the adhesive 20 can be reduced. As a result, the deterioration in image quality due to the deterioration or the like of the adhesive 20 can be suppressed.

3. Third Embodiment

In a third embodiment described below, components whose functions are identical to those of the first embodiment are assigned the same reference signs as those used in the description of the first embodiment. Further, a detailed description of the components is omitted as appropriate.

Figure 8:
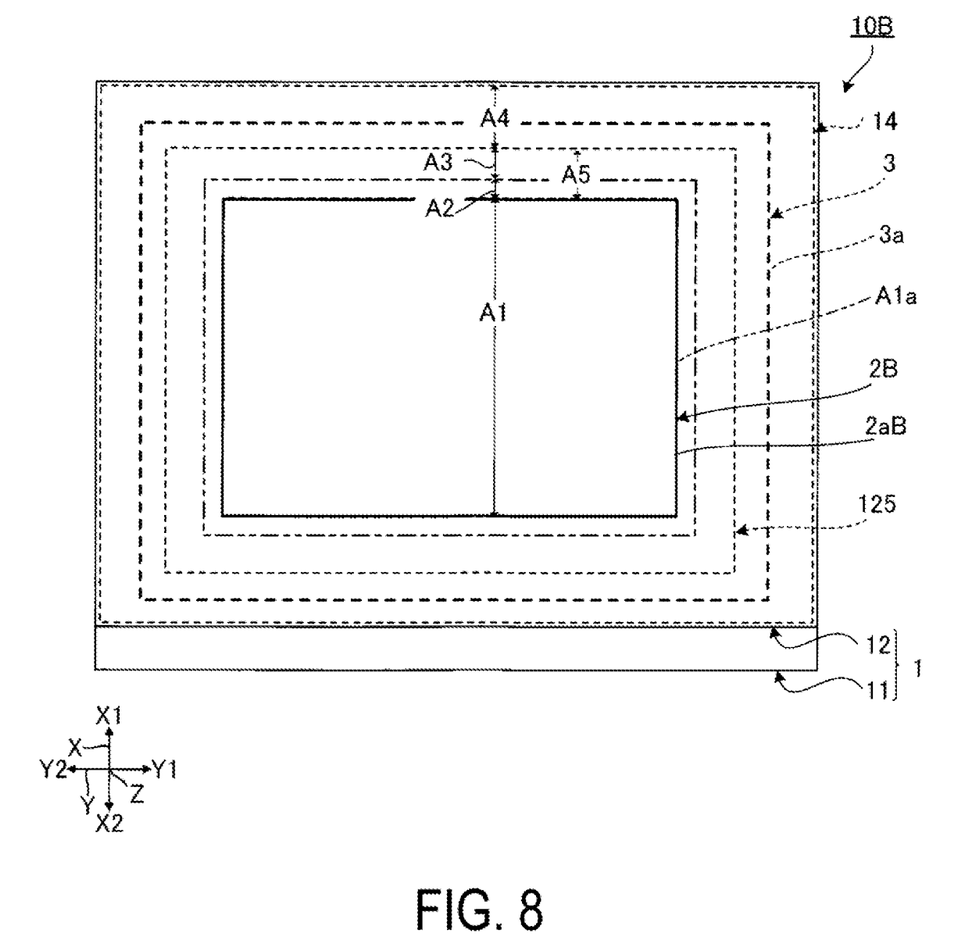
FIG. 8 is a plan view illustrating an arrangement of a first translucent plate according to a third embodiment.

FIG. 8 is a plan view illustrating an arrangement of a first translucent plate 2B according to the third embodiment. In the present embodiment, as illustrated in FIG. 8, the planar area of the first transparent plate 2B included in a display panel unit 10B is equal to the planar area of the display region A1. Thus, an outer edge 2aB of the first translucent plate 2B overlaps with the outer edge A1a of the display region A1 in plan view. Even in this case, the attachment of foreign matter in the display region A1 can be suppressed in the same manner as in the first embodiment. Further, by overlapping the outer edge 2aB of the first translucent plate 2B with the outer edge A1a of the display region A1 in plan view, the area of bonding for the first translucent plate 2B and the display panel 1 using the adhesive 20 can be reduced to a minimum. Therefore, the deterioration in image quality due to the deterioration or the like of the adhesive 20 can be particularly effectively suppressed.

4. Fourth Embodiment

In a fourth embodiment described below, components whose functions are identical to those of the first embodiment are assigned the same reference signs as those used in the description of the first embodiment. Further, a detailed description of the components is omitted as appropriate.

Figure 9:
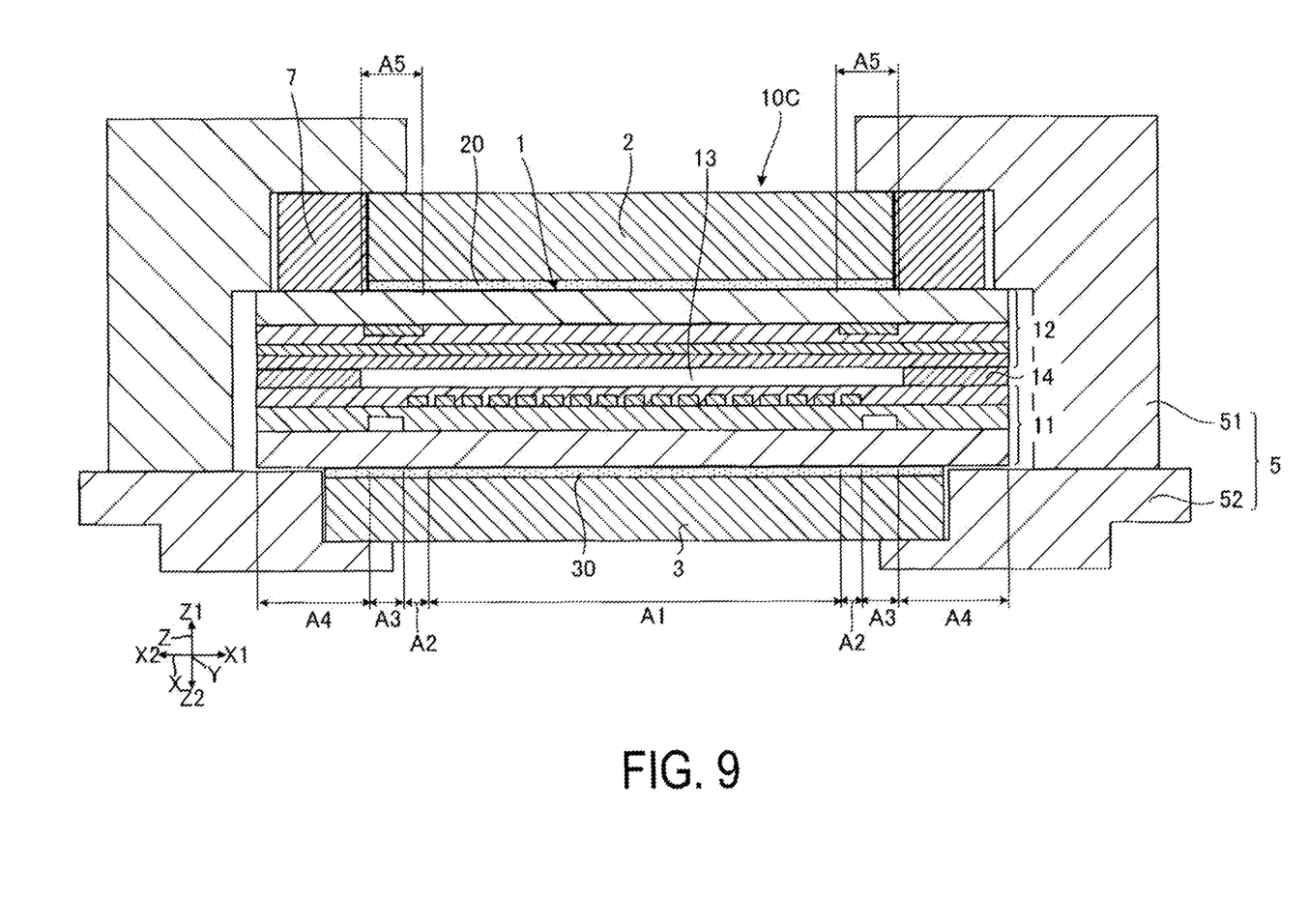
FIG. 9 is a cross-sectional view of a display panel unit and a holding member according to a fourth embodiment.
Figure 10:
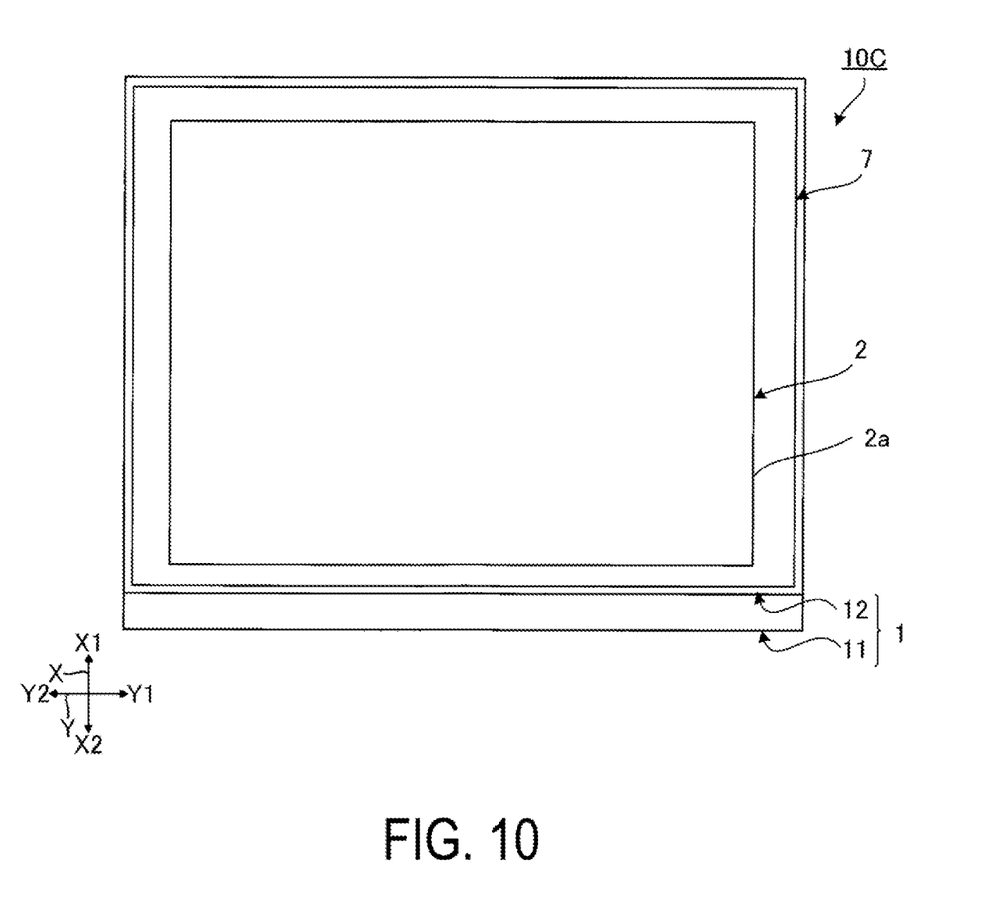
FIG. 10 is a plan view illustrating an arrangement of a heat conduction member according to the fourth embodiment.

FIG. 9 is a cross-sectional view of a display panel unit 10C and the holding member 5 according to the fourth embodiment. FIG. 10 is a plan view illustrating an arrangement of a heat conduction member 7 according to the fourth embodiment. As illustrated in FIG. 9, the display panel unit 10C includes the heat conduction member 7 according to the present embodiment. The heat conduction member 7 is provided in order to dissipate heat from the display panel 1. Further, the heat conduction member 7 is in contact with the cover 51 and the display panel 1, and functions as a spacer that fills a space between the cover 51 and the display panel 1. The heat conduction member 7 is in contact with the first translucent plate 2, but need not necessarily be in contact with the first translucent plate 2.

As illustrated in FIG. 10, the heat conduction member 7 is disposed along the outer edge 2a of the first translucent plate 2 in plan view. In the present embodiment, the heat conduction member 7 surrounds the first translucent plate 2 in plan view. Further, the thermal conductivity of the heat conduction member 7 is higher than the thermal conductivity of the first translucent plate 2. By providing the display panel 1 with the thermal conductive member 7, the heat dissipation of the display panel 1 can be improved compared to a case in which the heat conduction member 7 is not provided. Thus, the possibility of defects in the display panel 1, such as a malfunction or the like occurring due to the accumulation of heat in the display panel 1, can be suppressed.

The difference between the thermal conductivity of the heat conduction member 7 and the thermal conductivity of the first translucent plate 2 is, for example, from 100 (W/(m·K)) to 300 (W/(m·K)). Examples of the constituent material of the heat conduction member 7 include metals, such as aluminum, magnesium, copper, and the like, or an alloy including the metals. In particular, by using aluminum as the constituent material for the heat conduction member 7, the heat conduction member 7 having any shape can be easily processed and the heat dissipation of the display panel 1 can be particularly improved.

Further, the heat conduction member 7 and the counter substrate 12 are preferably not bonded using an adhesive. In this way, the occurrence of the deterioration or deformation of the adhesive due to the effect of the light LL can be avoided. Further, in the present embodiment, the thermal conductivity of the heat conduction member 7 is higher than the thermal conductivity of the first translucent plate 2, but may be equal to the thermal conductivity of the first translucent plate 2. In this case, in order to avoid the occurrence of the deterioration or deformation of the adhesive due to the effect of the light LL, the heat conduction member 7 is not bonded to the opposing substrate 12 using an adhesive.

Further, the heat conduction member 7 does not overlap with the display region A1 in plan view. In the present embodiment, the heat conduction member 7 overlaps with the light shielding region A5, the sealing region A4, the circuit region A3, and the dummy pixel region A2 in plan view. However, the heat conduction member 7 need not necessarily overlap with any of the light shielding region A5, the sealing region A4, the circuit region A3, and the dummy pixel region A2 in plan view. Further, the display panel unit 10A according to the second embodiment may also be provided with the heat conduction member 7. Similarly, the display panel unit 10B according to the third embodiment may be provided with the heat conduction member 7.

5. Modified Example

Each of the embodiments exemplified above can be variously modified. Modes of specific modifications that can be applied to each of the embodiments described above are exemplified below. Two or more modes freely selected from exemplifications described below can be appropriately combined as long as mutual contradictions do not arise.

In the first embodiment, the outer edge 2a of the first translucent plate 2 is positioned on the inside of the outer edge 3a of the second light translucent plate 3 in plan view. However, the outer edge 2a of the first translucent plate 2 may overlap with the outer edge 3a of the second translucent plate 3 in plan view. In other words, the planar areas of the first translucent plate 2 and the second translucent plate 3 may be equal, and the first translucent plate 2 and the second translucent plate 3 may overlap in plan view. By making the planar areas of the first translucent plate 2 and the second translucent plate 3 equal, deformation of the display panel 1 due to differences in the coefficients of thermal expansion of the first translucent plate 2 and the second translucent plate 3 can be reduced.

In each of the embodiments described above, the counter substrate 12 is positioned on the side of the element substrate 11 on which the light LL is incident, but the counter substrate 12 may be positioned on the side of the element substrate 11 from which the light LL is emitted. In other words, the counter substrate 12 may be bonded to the second translucent plate 3, and the element substrate 11 may be bonded to the first translucent plate 2.

In each of the embodiments described above, a case in which the transistor is a TFT has been described as an example, but the transistor is not limited to a TFT, and may be, for example, a metal-oxide-semiconductor field-effect transistor (MOSFET) or the like.

In each of the embodiments described above, the electro-optical device 100 using the active matrix driving method is exemplified, but the driving method of the electro-optical device may be a passive matrix driving method or the like, for example.

B. Electronic Apparatus

The electro-optical device 100 can be used in various types of electronic apparatus.

Figure 11:
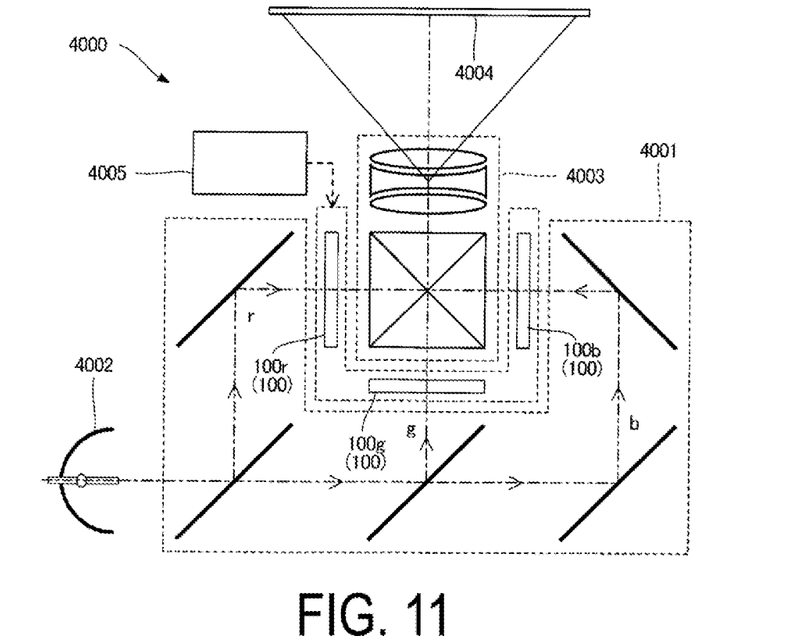
FIG. 11 is a schematic view illustrating a projector as an example of an electronic apparatus.

FIG. 11 is a schematic view illustrating a projector, which is an example of an electronic apparatus. A projection-type display device 4000 is a three-plate type projector, for example. An electro-optical device 100r is the electro-optical device 100 corresponding to a red display color, an electro-optical device 100g is the electro-optical device 100 corresponding to a green display color, and an electro-optical device 100b is the electro-optical device 100 corresponding to a blue display color. In other words, the projection-type display device 4000 includes the three electro-optical devices 100r, 100g, and 100b that respectively correspond to display colors of red, green, and blue. A control unit 4005 includes a processor and a memory, for example, and controls the operation of the electro-optical device 100.

Of light emitted from an illumination device 4002, which is a light source, an illumination optical system 4001 supplies a red component r to the electro-optical device 100r, a green component g to the electro-optical device 100g, and a blue component b to the electro-optical device 100b. Each of the electro-optical devices 100r, 100g, and 100b functions as an optical modulator, such as a light valve, that modulates light of each of the respective colors supplied from the illumination optical system 4001, in accordance with a display image. A projection optical system 4003 synthesizes the light emitted from each of the electro-optical devices 100r, 100g, and 100b and projects the combined light onto a projection surface 4004.

Blue light is incident on the display panel 1 of the electro-optical device 100b. The wavelength range of blue light is shorter than the wavelength range of red or green light, and the energy of blue light is higher than the energy of red or green light. Therefore, by the electro-optical device 100b being the electro-optical device 100 described above, a deterioration in image quality due to blue light can be particularly effectively suppressed. Note that for example, blue light corresponds to light in a wavelength band of 430 nm to 480 nm. Green light corresponds to light in a wavelength band of 480 nm to 520 nm. Red light corresponds to light in a wavelength band of 620 nm to 810 nm.

Figure 12:
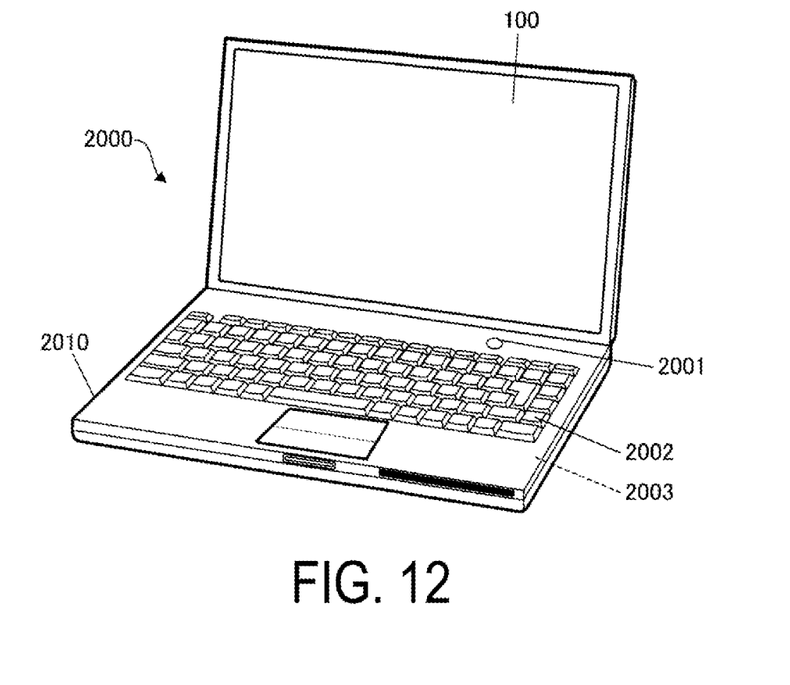
FIG. 12 is a perspective view illustrating a personal computer as an example of the electronic apparatus.

FIG. 12 is a perspective view illustrating a personal computer 2000 as an example of the electronic apparatus. The personal computer 2000 includes the electro-optical device 100 that displays various images, a main body portion 2010 in which a power source switch 2001 and a keyboard 2002 are installed, and a control unit 2003. The control unit 2003 includes a processor and a memory, for example, and controls the operation of the electro-optical device 100.

Figure 13:
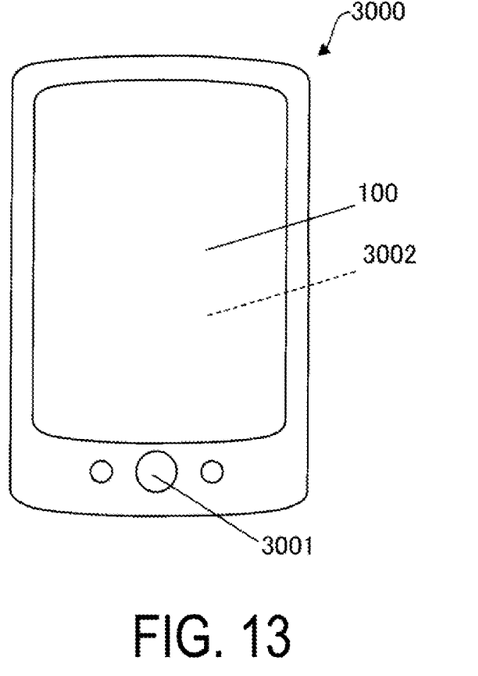
FIG. 13 is a plan view illustrating a smart phone as an example of the electronic apparatus.

FIG. 13 is a plan view illustrating a smart phone 300 as an example of the electronic apparatus. The smart phone 3000 includes an operation button 3001, the electro-optical device 100 that displays various images, and a control unit 3002. Screen content displayed on the electro-optical device 100 is changed in accordance with the operation of the operation button 3001. The control unit 3002 includes a processor and a memory, for example, and controls the operation of the electro-optical device 100.

The electronic apparatus includes the electro-optical device 100 and the control units 2003, 3002 or 4005 described above. As described above, the electro-optical device 100 can suppress a deterioration in image quality. Therefore, the display quality of the personal computer 2000, the smart phone 3000, or the projection-type display device 4000 can be increased.

Note that, the electronic apparatus to which the electro-optical device according to the present disclosure is applied is not limited to the apparatuses exemplified, and may be a terminal such as a personal digital assistant (PDA), a digital still camera, a television, a video camera, a car navigation device, a display device for in-vehicle use, an electronic organizer, electronic paper, an electronic calculator, a word processor, a workstation, a videophone, a point of sale (POS) terminal, or the like. Additionally, for the electronic apparatus to which the present disclosure is applied, other examples include an apparatus provided with a printer, a scanner, a copier, a video player, or a touch panel.

The present disclosure is described above based on the preferred embodiments, but the present disclosure is not limited to the embodiments described above. In addition, the configuration of each component of the present disclosure may be replaced with any configuration that achieves the equivalent functions of the above-described embodiments, and any configuration may be added for this purpose.

What is claimed is:

1. An electro-optical device comprising:
a first translucent plate on which light is incident;
a display panel bonded to the first translucent plate;
a second translucent plate bonded to a surface of the display panel on an opposite side from the first translucent plate and configured to emit light from the display panel, wherein
the display panel includes
a first substrate including a plurality of pixel electrodes provided in a display region,
a second substrate including a common electrode,
an electro-optical layer which is disposed between the plurality of pixel electrodes, and
a sealing member provided in a sealing region along an outer edge of the display region and between the first substrate and the second substrate, and configured to adhere the first substrate and the second substrate together, and
when seen from a thickness direction of the first translucent plate, an outer edge of the first translucent plate overlaps the outer edge of the display region or is positioned between the display region and the sealing region.

2. The electro-optical device according to claim 1, wherein
when seen from the thickness direction, the outer edge of the first translucent plate is closer to the display region than to the sealing region.

3. The electro-optical device according to claim 1, wherein
when seen from the thickness direction, the first substrate further includes a plurality of dummy pixel electrodes provided in a dummy pixel region positioned between the sealing region and the display region, and
when seen from the thickness direction, the outer edge of the first translucent plate overlaps the dummy pixel region.

4. The electro-optical device according to claim 1, wherein
when seen from the thickness direction, the display panel further includes a light shielding portion having light shielding properties and disposed between the sealing region and the display region and along the outer edge of the display region, and
when seen from the thickness direction, the outer edge of the first translucent plate overlaps the light shielding portion.

5. The electro-optical device according to claim 1, wherein
when seen from the thickness direction, the outer edge of the first translucent plate is positioned further to an inner side than an outer edge of the second translucent plate.

6. The electro-optical device according to claim 1, wherein
blue light is incident on the display panel.

7. The electro-optical device according to claim 1, further comprising a heat conduction member disposed along the outer edge of the first translucent plate and having a higher thermal conductivity than the first translucent plate.

8. The electro-optical device according to claim 1, further comprising a holding member configured to hold the display panel, wherein
the holding member is in contact with the first translucent plate.

9. An electronic apparatus comprising:
the electro-optical device according to claim 1; and
a control unit configured to control an operation of the electro-optical device.

* * * * *